United States Patent [19]

Seidel

[11] 3,872,412

[45] Mar. 18, 1975

[54] DIELECTRIC-LOADED CHOKES

[75] Inventor: Harold Seidel, Warren, N.J.

[73] Assignee: Bell Telephone Laboratories, Incorporated, Murray Hill, N.J.

[22] Filed: Apr. 26, 1974

[21] Appl. No.: 464,479

[52] U.S. Cl. ................ 333/73 R, 333/73 C, 333/76, 333/96, 333/97 R

[51] Int. Cl. ........ H01p 1/20, H01p 3/06, H01p 7/04

[58] Field of Search ....... 333/97 R, 73 W, 76, 73 R, 333/96, 73 C, 73 S, 12, 82 R, 82 B, 83 R

[56] References Cited

UNITED STATES PATENTS

| | | | |
|---|---|---|---|
| 2,392,664 | 1/1946 | Gurewitsch | 333/73 C |
| 2,470,805 | 5/1949 | Collard | 333/73 |

*Primary Examiner*—James W. Lawrence
*Assistant Examiner*—Marvin Nussbaum
*Attorney, Agent, or Firm*—S. Sherman

[57] ABSTRACT

To provide discrimination between harmonically related signals, the conventional short-circuited and opencircuited transmission line choke is modified by dividing it into two dissimilar regions. In the short-circuited choke, the first region, adjacent to the input end, is loaded by means of a first dielectric material having a first dielectric constant $\epsilon_1$. The second region, constituting the balance of the line, is loaded by means of a second dielectric material having a second dielectric constant $\epsilon_2$, where $\epsilon_2$ is greater than $\epsilon_1$. In the open-circuited choke, $\epsilon_2$ is less than $\epsilon_1$. In either case, the desired input impedance characteristic of the choke is realized by adjusting the magnitudes of $\epsilon_1$ and $\epsilon_2$, and the lengths of the two regions.

12 Claims, 6 Drawing Figures

DIELECTRIC-LOADED CHOKES

The present invention relates to dielectric-loaded transmission line chokes.

BACKGROUND OF THE INVENTION

Many circuits require some means of separating signals of different frequencies. For example, one may wish to block a lower frequency signal while passing a higher frequency signal. A convenient way of realizing this type of frequency discrimination is to insert a quarter-wave, short-circuited stub in the signal path. However, if the higher frequency signal happens to be an odd harmonic of the lower frequency signal, this technique cannot be used as the stub will be an odd multiple of a quarter of a wavelength at both frequencies, and consequently both signals will be blocked equally.

Conversely, one may wish to pass a lower frequency signal while blocking a higher frequency signal. In this latter case, a half-wave, short-circuited stub can be used so long as the two signals are not harmonically related.

Inasmuch as the signals associated with harmonic generators are harmonically related, the so-called "quarter-wave" and "half-wave" chokes described hereinabove cannot always be used.

It is, accordingly, the broad object of the present invention to affect frequency discrimination between harmonically related signals using nominal "quarter-wave" and "half-wave" chokes.

SUMMARY OF THE INVENTION

A choke, in accordance with the present invention, comprises a length of transmission line short-circuited or open-circuited at its end. A first region of the line, adjacent to the input end, is loaded by means of a first dielectric material having a first dielectric constant $\epsilon_1$. A second region, constituting the balance of the line, is loaded by means of a second dielectric material having a dielectric constant $\epsilon_2$. For the short-circuited choke, $\epsilon_2$ is greater than $\epsilon_1$. For the open-circuited choke, $\epsilon_2$ is less than $\epsilon_1$. In either case, the desired input impedance characteristic is realized by adjusting the magnitudes of $\epsilon_1$ and $\epsilon_2$ and the lengths of the two regions. In one embodiment of a short-circuited choke, the parameters of the two regions are proportioned such that the input impedance of the line is very much higher at a specified frequency than it is at a selected odd harmonic of said specified frequency. In a second embodiment of a short-circuited choke, the parameters of the two regions are proportioned such that the input impedance of the line is very much lower at a specified frequency than it is at a selected harmonic of said specified frequency.

In one embodiment of an open-circuited choke, the parameters of the two regions are proportioned such that the input impedance of the line is very much lower at a specified frequency than it is at a selected odd harmonic of said specified frequency. In a second embodiment of an open-circuited choke, the parameters of the two regions are proportioned such that the input impedance of the line is very much higher at a specified frequency than it is at a selected harmonic of said specified frequency.

These and other objects and advantages, the nature of the present invention and its various features will appear more fully upon consideration of the illustrative embodiments now to be described in detail in connection with the following drawings.

DETAILED DESCRIPTION

Figure 1:
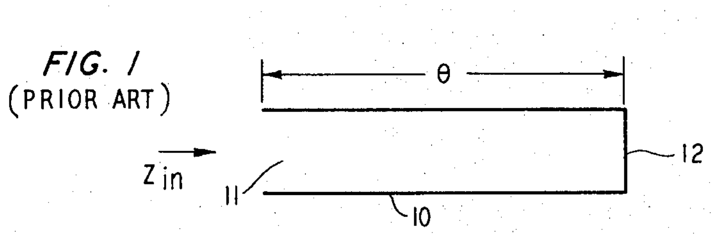
FIG. 1 (PRIOR ART)
FIG. 1 shows a prior art short-circuited transmission line choke.

Referring to the drawings, FIG. 1 shows a prior art short-circuited transmission line choke comprising a length of transmission line 10, open-circuited at its input end 11, and short-circuited at its other end 12.

In general, the input impedance $Z_{in}$ of a length of uniform low-loss transmission line is given by $$Z_{in} = Z_0 \; [Z_e \cos\theta + i\, Z_0 \sin\theta \;/ Z_0 \cos\theta + i\, Z_e \sin\theta] \quad (1)$$

where $Z_0$ is the characteristic impedance of the line:

$\theta$ is the electrical length of the line and $Z_e$ is the terminating impedance at the end of the line.

For a short-circuited choke $Z_e = O$, and the input impedance approaches infinity at a frequency $f$ for which the line length corresponds to one-quarter of a wavelength. That is, for $\theta = \lambda/4$, equation (1) reduces to $$Z_{in} = i\, Z_0 \tan \mathbf{90} = \infty. \quad (2)$$

Figure 2:
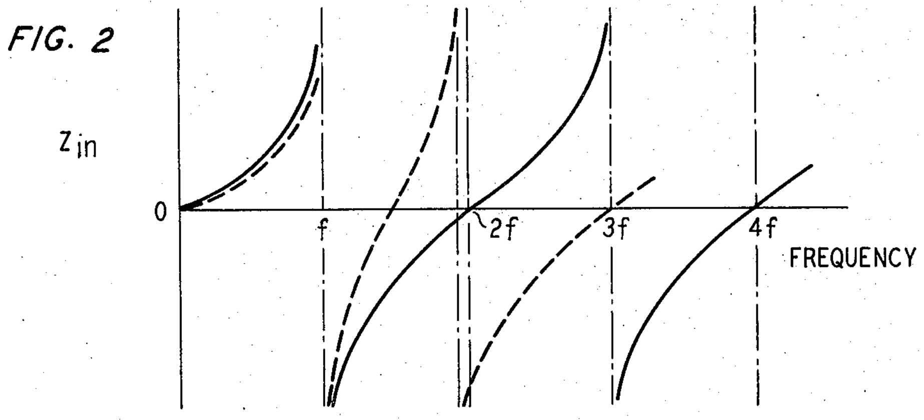
FIG. 2 shows the variations of the input impedance of a short-circuited length of transmission line as a function of frequency.

As the frequency is increased, the input impedance decreases to zero at a frequency $2f$, and then increases once again, approaching infinity at a frequency $3f$. The wellknown variation of the input impedance of a short-circuited transmission line as a function of frequency is illustrated by the solid line curves in FIG. 2. The important thing to note is that such a length of line, in its conventional form, will disply the same high input impedance whenever its length is equal to a frequency $f$ for which the line length is equal to a quarter of a wavelength. As such, a quarter-wave choke cannot be used as a means of separating a signal and an odd harmonic of said signal. Similarly, it will be noted that a short-circuited length of transmission line exhibits a low input impedance at a frequency $2f$ for which $\theta$ is equal to one-half a wavelength and at integral multiples thereof. As such, a half-wave choke cannot be used as a means of separating a signal and its harmonics.

What is needed is a choke that will have a high impedance at one frequency of interest and, at the same time, exhibit a much lower impedance at another frequency of interest, where the two frequencies are harmonically related.

Figure 3:
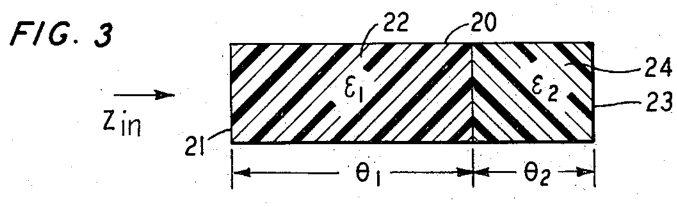
FIG. 3 shows a short-circuited transmission line choke in accordance with the invention.

In accordance with the present invention, the above described impedance characteristic is realized by the unequal loading of the transmission line. In the case of a short-circuited choke, the short-circuited end of the line is loaded by means of a higher dielectric material than the input end of the line. Such a choke, illustrated in FIG. 3, comprises as in the prior art, a length of transmission line 20 short-circuited at an end 23. However, in accordance with the present invention, the line length is divided into two dissimilar regions. The first region, adjacent to the input end 21, is filled with a first dielectric material 22 having a first dielectric constant $\epsilon_1$. The second region, adjacent to the short-circuited end 23, is filled with second dielectric material 24 having a second dielectric constant $\epsilon_2$, where $\epsilon_2$ is greater than $\epsilon_1$.

The normalized input impedance for such a choke is given by $$Z_{in}=i\left\{\frac{\frac{1}{\sqrt{\epsilon_2}}\cos n\theta_1 \sin n\theta_2+\frac{1}{\sqrt{\epsilon_1}}\sin n\theta_1 \cos n\theta_2}{\cos n\theta_1 \cos n\theta_2-\sqrt{\frac{\epsilon_1}{\epsilon_2}}\sin n\theta_1 \sin n\theta_2}\right\} \quad (3)$$

where $\theta_1$ and $\theta_2$ are the electrical lengths of the two regions at the fundamental frequency; and $n$ is the order of the harmonic.

There are two possible modes of operation. In a first embodiment of the invention, the parameters are selected such that the choke has a high impedance at the fundamental frequency and a low impedance at an odd harmonic frequency.

For $Z_{in} = \infty$ at the fundamental frequency $f$, (i.e., $n = 1$), we set the denominator of equation (3) equal to zero. This gives $$\cos \theta_1 \cos \theta_2 - \sqrt{(\epsilon_1/\epsilon_2)} \sin \theta_1 \sin \theta_2 = O. \quad (4)$$

For $Z_{in} = O$ at the harmonic frequency nf, we set the numerator of equation (3) equal to zero, thus yielding $$1/\sqrt{\epsilon_2} \cos n\theta_1 \sin n\theta_2 + 1/\sqrt{\epsilon_1} \sin n\theta_1 \cos n\theta_2 = 0 \quad (5)$$

It will be noted that these two equations have four variables $\epsilon_1$, $\theta_1$, $\epsilon_2$, and $\theta_2$. Accordingly, two parameters can be arbitrarily selected and the other two obtained by the simultaneous solution of the two equations.

EXAMPLE

Assume:

$$\epsilon_1 = 1 \text{ (air)}$$

$$\epsilon_2 = 10$$

a fundamental frequency = 2 GHz and $$n = 3.$$

This gives:

$\theta_1 = 59.4$, or a length of 0.975 inches.

$\theta_2 = 61.9$, or a length of 0.321 inches.

$Z_{in}$ at 2 GHz = $8.33 \times 10^8$ $Z_{in}$ at 6 GHz = $1.16 \times 10^{-8}$ Thus, a nominal quarter-wave choke, designed in accordance with the present invention, has an input impedance that is 16 orders of magnitude greater at the fundamental frequency than it is at the third harmonic of the fundamental frequency.

The effect of the dielectric loading upon the input impedance can be understood by referring once again to FIG. 2. As noted above, in the unloaded, quarter-wave choke the input impedance is a maximum at the fundamental frequency $f$ and at all odd harmonics of the fundamental, as shown by the solid curves. By placing a higher dielectric material near the short-circuited end of the choke, where the electric field at the fundamental frequency is relatively small, there is only a slight perturbation at the fundamental frequency. However, at the higher frequencies, more of the electric field is crowded into the higher dielectric material, effectively lengthening the choke by 90 degrees. This is shown by the broken curves in FIG. 2 which show the input impedance peaking at the fundamental frequency, $f$, as before, but then passing through a second maximum at a frequency lower than $3f$. In this particular illustration, the input impedance is a minimum at the third harmonic $3f$.

In a second embodiment of the invention, the parameters are selected such that the choke has a low impedance at the fundamental frequency and a high impedance at a particular harmonic frequency.

For $Z_{in} = 0$ at the fundamental (i.e., $n = 1$), we set the numerator of equation (3) equal to zero. This gives $1/\sqrt{\epsilon_2} \cos \theta_1 \sin \theta_2 + 1/\sqrt{\epsilon_1} \sin \theta_1 \cos \theta_2 = 0.$ For $Z_{in} = \infty$ at the harmonic frequency, we set the denominator of equation (3) equal to zero, thus obtaining $\cos n\theta_1 \cos n\theta_2 - \sqrt{\epsilon_1/\epsilon_2} \sin n\theta_1 \sin n\theta_2 = O. \quad (7)$ The two equations (6) and (7) can then be simultaneously solved as explained hereinabove.

Figure 4:
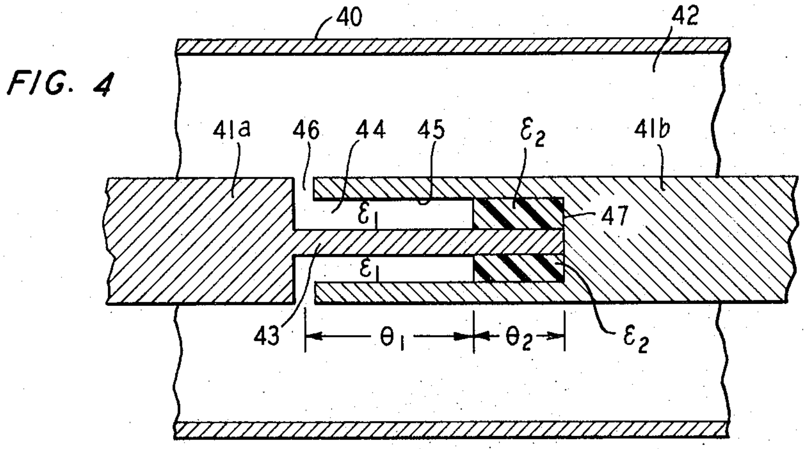
FIG. 4 shows a choke, in accordance with the invention, incorporated into a coaxial cable.
Figure 5:
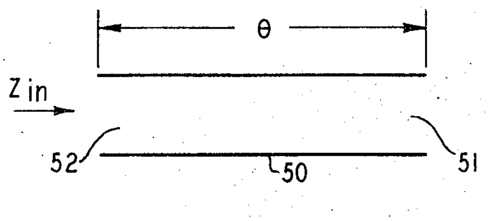
FIG. 5 (PRIOR ART)
FIG. 5 shows a prior art open-circuited choke.

FIG. 4 shows, in longitudinal cross-section, a section of coaxial cable incorporating a short-circuited choke in accordance with the present invention. The cable comprises an outer, hollow, cylindrical conductor 40 surrounding an inner conductor shown as comprising two portions 41*a* and 41*b*. The region 42 between the inner and outer conductors is filled with a dielectric material.

The end of conductor portion 41*a* includes a reduced diameter region 43 which extends into an adjacent, hollowed out end region 45 of conductor portion 41*b*. By making the outside diameter of region 43 less than the inside diameter of region 45, and the length of region 43 greater than the length of region 45, an annular short-circuited choke 44 is formed. Signal access is through an annular gap 46 which results because of the unequal lengths of the end regions.

The region of the choke adjacent to gap 46 is filled with a first dielectric material having a dielectric constant $\epsilon_1$. The short-circuited end of the choke, formed by the physical contact of end region 43 of conductor portion 41*a* and conductor portion 41*b*, is filled with a second material having a dielectric constant $\epsilon_2$, where $\epsilon_2$ is greater than $\epsilon_1$.

Depending upon the particular frequency discrimination desired, the dielectric constants $\epsilon_1$, and $\epsilon_2$ and the relative lengths $\theta_1$ and $\theta_2$ of the two regions of the choke are proportioned as explained hereinabove.

Figure 6:
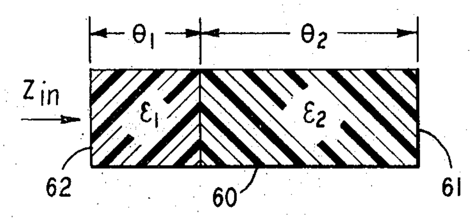
FIG. 6 shows an open-circuited transmission line choke in accordance with the present invention.

FIG. 6, now to be considered, shows a prior art open-circuited choke comprising a length of uniform transmission line of length $\theta$, open circuited at one end 51. The input impedance $Z_{in}$ at the other end 52 of such a line is given by $$Z_{in} = iZ_o \mathrm{Cot}\, \theta, \tag{8}$$

where $Z_o$ is the characteristic impedance of the line.

At those frequencies of which $\theta$ is equal to a quarter of a wavelength, or odd multiples thereof, $Z_{in}$ is equal to zero. At those frequencies for which $\theta$ is equal to half a wavelength, or multiples thereof, $Z_{in}$ approaches infinity. To modify these harmonic relationships, the prior art open-circuit choke is modified, in accordance with the present invention, by unequal loading the transmission live in the manner illustrated in FIG. 7 which shows a length of transmission line 60 open circuited at the far end 61. A first region of said line, adjacent to the input end 62 is loaded by means of a first dielectric constant $\epsilon_1$. A second region, constituting the balance of said line, is loaded by means of a second dielectric material having a dielectric constant $\epsilon_2$, where $\epsilon_1$ is larger than $\epsilon_2$. The normalized input impedance for such a choke is given by $$Z_{in} = i\left\{\frac{\cos n\theta_1 \cos n\theta_2 - \sqrt{\frac{\epsilon_2}{\epsilon_1}}\sin n\theta_1 \sin n\theta_2}{\sqrt{\epsilon_2}\cos n\theta_1 \sin n\theta_2 + \sqrt{\epsilon_1}\sin n\theta_1 \cos n\theta_2}\right\} \tag{9}$$

For the case of a low input impedance at a fundamental frequency ($Z_{in} = 0$ for $n = 1$) and a high impedance at an odd harmonic ($Z_{in} =$ for $n > 1$), we get the numerator of equation (9) equal to zero for the fundamental, and the denominator equal to zero for the harmonic, thus obtaining the following relationships $$\cos\theta_1 \cos\theta_2 - \sqrt{(\epsilon_1/\epsilon_2)}\sin\theta_1 \sin\theta_2 = O \tag{10}$$

and $$\sqrt{\epsilon_2}\cos n\theta_1 \sin n\theta_2 + \sqrt{\epsilon_1}\sin n\theta_1 \cos n\theta_2 = O. \tag{11}$$

In a choke which exhibits a high impedance at a fundamental frequency ($Z_{in} = O$ at $n = 1$) and a much lower impedance at some harmonic frequency ($Z_{in} = 0$ at $n > 1$), we set the denominator of equation (9) equal to zero for the fundamental, and the numerator equal to zero for the harmonic, thus obtaining a second pair of equations $$\sqrt{\epsilon_2}\cos\theta_1 \sin\theta_2 + \sqrt{\epsilon_1}\sin\theta_1 \cos\theta_2 = 0 \tag{12}$$

and $$\cos n\theta_1 \cos n\theta_2 - \sqrt{(\epsilon_2/\epsilon_1)}\sin n\theta_1 \sin n\theta_2 = 0. \tag{13}$$

In either case, the two equations are solved simultaneously, as explained hereinabove to determine $\epsilon_1\epsilon_2$, $\theta_1$ and $\theta_2$.

In all the embodiments described it was assumed that all of the input impedance is provided by a particularly loaded length of transmission line and its termination. In specific instances, however, the input impedance can also include a lumped reactance at the input end of the choke which results from the nature of the structure. For example, in FIG. 4 there is a discontinuity at the input end of the choke in the region of gap 46. Since the resulting lumped capacitive reactance will modify the results obtained by solving the relevant pairs of equations as outlined hereinabove, any lumped reactances should be taken into account if significant.

It is understood that the above described arrangement is illustrative of but one of the many possible specific embodiments which can represent applications of the principles of the invention. Thus, numerous and varied other embodiments can readily be devised in accordance with these principles by those skilled in the art without departing from the spirit and scope of the invention.

What is claimed is:

1. A dielectric-loaded choke comprising:

a length of transmission line open circuited at its input end and reactively terminated at its other end;

a first region of said line, adjacent to the input end, being loaded by means of a first dielectric material having a dielectric constant $\epsilon_1$;

a second region of said line, constituting the remaining portion of said line, being loaded by means of a second dielectric material having a second dielectric constant $\epsilon_2$, where $\epsilon_2$ and $\epsilon_1$ are unequal;

the parameters of said choke, including the lengths of said two regions, and the magnitudes of $\epsilon_1$ and $\epsilon_2$, being proportioned to produce an input impedance to said choke that is much different at one frequency than it is at a second frequency where said two frequencies are harmonically related.

2. The choke according to claim 1 wherein said reactive termination is a short circuit.

3. The choke according to claim 1 wherein said reactive termination is an open circuit.

4. The choke according to claim 1 wherein:

said reactive termination is a short circuit;

$\epsilon_2$ is greater than $\epsilon_1$;

and wherein the parameters of said choke are proportioned such that the input impedance of said choke at said one frequency is much larger than the input impedance at said second frequency, where said second frequency is an odd harmonic of said one frequency.

5. The choke according to claim 4 wherein the parameters of said choke are related by $$\cos\theta_1 \cos\theta_2 - \sqrt{(\epsilon_1/\epsilon_2)} \sin\theta_1 \sin\theta_2 = 0$$

and $$1/\sqrt{\epsilon_2} \cos\theta_1 \sin n\theta_2 = 1/\sqrt{\epsilon_1} \sin n\theta_1 \cos n\theta_2 = 0;$$

where $\theta_1$ and $\theta_2$ are the electrical lengths, respectively of said first and second regions at said one frequency;
and $n$ is an odd integer defining the odd harmonic order of said second frequency.

6. The choke according to claim 1 wherein the parameters of said choke are proportioned such that the input impedance of said choke at said one frequency is much lower than the input impedance of said choke said second frequency.

7. The choke according to claim 6 wherein the parameters of said choke are related by $$1/\sqrt{\epsilon_2} \cos\theta_1 \sin\theta_2 + 1/\sqrt{\epsilon_2} \sin\theta_1 \cos\theta_2 = 0$$

and $$\cos n\theta_1 \cos n\theta_2 - \sqrt{(\epsilon_1/\epsilon_2)} \sin n\theta_1 \sin n\theta_2 = 0;$$

where $\theta_1$ and $\theta_2$ are the electrical lengths respectively, of said first and second regions at said one frequency;
and $n$ is an integer defining the harmonic order of said second frequency.

8. The choke according to claim 1 wherein said transmission line is a conductively bounded waveguide;
and wherein said dielectric materials fill the bounded volume.

9. The choke according to claim 1 wherein said transmission line comprises an annular recess formed in the inner conductor of a coaxial cable.

10. The choke according to claim 1 wherein:
said reactive termination is an open circuit;
$\epsilon_1$ is greater than $\epsilon_2$;
and wherein the parameters of said choke are proportioned such that the input impedance of said choke at said one frequency is much less than the input impedance at said second frequency, where said second frequency is an odd harmonic of said one frequency.

11. The choke according to claim 10 wherein the parameters of said choke are related by $$\cos\theta_1 \cos\theta_2 - \sqrt{(\epsilon_2/\epsilon_1)} \sin\epsilon_1 \sin\epsilon_2 = 0$$

and $\sqrt{\epsilon_2} \cos n\theta_1 \sin n\theta_1 + \sqrt{\epsilon_1} \sin n\theta_1 \cos n\theta_2 = 0;$
where $\theta_1$ and $\theta_2$ are the electrical lengths, respectively, of said first and second regions at said one frequency;
and $n$ is an odd integer defining the odd harmonic frequency of said second frequency.

12. The choke according to claim 10 wherein the parameters of said choke are related by $$\sqrt{\epsilon_2} \cos\theta_1 \sin\theta_2 + \sqrt{\epsilon_1} \sin\theta_1 \cos\theta_2 = 0$$

and $$\cos n\theta_1 \cos n\theta_2 - \sqrt{\epsilon_2/\epsilon_1} \sin n\theta_1 \sin n\theta_2 = 0;$$

where $\theta_1$ and $\theta_2$ are the electrical lengths, respectively, of said first and second regions at said one frequency;
and $n$ is an integer defining the harmonic order of said second frequency.

* * * * *